United States Patent

Schmitz-Goeb et al.

[11] Patent Number: 5,715,809
[45] Date of Patent: Feb. 10, 1998

[54] RECEIVER FOR CONVERTING CONCENTRATED SOLAR RADIATION

[75] Inventors: Manfred Schmitz-Goeb, Gummersbach; Roland Graf, Theilenhofen, both of Germany

[73] Assignee: L. & C. Steinmüller GmbH, Gummersbach, Germany

[21] Appl. No.: 505,347

[22] PCT Filed: Feb. 23, 1994

[86] PCT No.: PCT/DE94/00187

§ 371 Date: Oct. 25, 1995

§ 102(e) Date: Oct. 25, 1995

[87] PCT Pub. No.: WO94/19652

PCT Pub. Date: Sep. 1, 1994

[30] Foreign Application Priority Data

Feb. 24, 1993 [DE] Germany ............ 43 05 668.7

[51] Int. Cl.$^6$ ............................................. F24J 2/26
[52] U.S. Cl. ........................ 126/674; 126/675; 126/680
[58] Field of Search .............................. 126/674, 675, 126/680, 676, 648, 649, 650

[56] References Cited

U.S. PATENT DOCUMENTS

| | | | |
|---|---|---|---|
| 3,875,925 | 4/1975 | Johnston | 126/674 |
| 4,186,721 | 2/1980 | Whitman | 126/674 |
| 4,326,504 | 4/1982 | Guadard et al. | 126/674 |
| 4,367,727 | 1/1983 | Llorach | 126/674 |
| 4,683,872 | 8/1987 | Fricker | 126/674 |

FOREIGN PATENT DOCUMENTS

| | | |
|---|---|---|
| 0124769 | 11/1984 | European Pat. Off. . |
| 2491599 | 4/1982 | France . |
| 2629086 | 1/1978 | Germany . |
| 4024216 | 2/1991 | Germany . |
| 669837 | 4/1989 | Switzerland . |

*Primary Examiner*—James C. Yeung
*Attorney, Agent, or Firm*—Robert W. Becker & Associates

[57] ABSTRACT

A high-temperature receiver for converting concentrated solar radiation has a channel with an inlet and an outlet. An areal air-permeable support element is connected to the inlet. An absorber structure for absorbing solar radiation is supported by the support element and is made of an air-permeable mat material. Air is transported as a cooling medium through the absorber structure in a flow direction identical to a direction in which the solar radiation hits the absorber structure. The mat material has a first density in an area where the solar radiation enters the absorber structure and a second density in an area where the absorber structure faces the support element. The first density is lower than the second density. The first density favors absorption of the solar radiation and the second density provides for a secure fastening of the absorber structure on the support element.

15 Claims, 3 Drawing Sheets

RECEIVER FOR CONVERTING CONCENTRATED SOLAR RADIATION

BACKGROUND OF THE INVENTION

The invention relates to a receiver for converting concentrated solar radiation, the receiver having a channel and an absorber structure, positioned at the channel inlet and exposed to the concentrated solar radiation, the absorber structure comprised of an air-permeable fiber-like mat material, and a means for transporting air as a cooling medium through the absorber structure.

From EP 124 769 B1 such a receiver is known. Across the channel cross-section metal knit mats are provided in addition to spaced apart wires which metal knit mats serve for absorbing the impinging, concentrated solar radiation. The wires are connected with their upper end to the channel wall and with their lower end support in the manner of a mass pendulum a cylindrical weight piece. In the embodiment according to FIG. 7 of EP 124 769 B1 the absorber structure is comprised of suspended wires and metal knit mats. For adaptation to the solar radiation density which is not constant across the channel cross-section, throttle means are arranged over the cross-sectional channel area such that in areas of higher radiation density greater amounts of air mass streams will occur than in the areas of lower radiation density. In an advantageous manner the throttle means may be realized by a varying density of the arrangement of the structure of the absorber means across the channel cross-section.

The air-permeable fiber-like material should be of a form that is as loose as possible so that the impinging solar radiation can penetrate into the depth of the mat and can be absorbed there. On the other hand, a secure fastening and positioning of the mat material within the channel cross-section requires a certain density.

It is therefore an object of the present invention to provide a receiver of the aforementioned kind with which the material, on the one hand, can absorb in the manner described above solar radiation and, on the other hand, can be securely held within the channel.

This object is solved by providing the mat material in the flow direction of air so as to have increasing density.

SUMMARY OF THE INVENTION

The air is transported in the direction of the impinging solar radiation through the mat material. In the inventive embodiment of the receiver a low density is provided in the direction of flow of air at the forward portion, i.e., a predetermined looseness, in order to absorb in a favorable manner the solar radiation, while the side facing away from the inlet side has a higher density which provides for a secure fastening and positioning of the mat material within the channel. The term "fiber-like mat material" in the subsequent description and in the claims is to be understood as a material that can be manufactured especially according to different methods known from textile technology. The term mat material includes thus, for example, mesh material, woven material, knit material, non-woven material, and fleece.

A high-temperature receiver for converting concentrated solar radiation according to the present invention is primarily characterized by the following features:

a channel with an inlet and an outlet;

an areal air-permeable support element connected to the inlet;

an absorber structure for absorbing solar radiation, the absorber structure supported by the support element and comprised of an air-permeable mat material;

means for transporting air as a cooling medium through the absorber structure in a flow direction identical to a direction in which the solar radiation hits the absorber structure;

wherein the mat material has a first density in an area where the solar radiation enters the absorber structure and a second density in an area where the absorber structure faces the support element; and wherein the first density is lower than the second density, the first density favoring absorption of the solar radiation and the second density providing for a secure fastening of the absorber structure on the support element.

Preferably, the mat material has a continuously increasing density from the first density toward the second density.

In the alternative, the mat material has a density that increases stepwise from the first density to the second density.

Preferably, the absorber structure comprises a first mat having the first density and a second mat having the second density.

In a preferred embodiment of the present invention, the absorber structure comprises a mat comprised of at least one sock section of a sock having in a circumferential direction thereof a first circumferential portion having the first density and a second circumferential portion having the second density, wherein the sock is areally compressed in the radial direction such that the first circumferential portion is directly exposed to the solar radiation. Preferably, the sock is a knit metal sock. In a further embodiment, the mat comprises a plurality of the sock sections.

The mat may be comprised of one of the sock sections and the areally compressed sock section is wound to a spiral.

The areal air-permeable support element is advantageously comprised of a plurality of support members arranged adjacent to one another so as to cover a cross-sectional area of the channel and the absorber structure is comprised of a plurality of individual mats. Each one of the mats is supported on one of the support members.

The contour of the individual mats substantially matches the contour of support members.

Preferably, a support structure with spacers connected within the channel downstream of the support element in the flow direction is provided, wherein each one of the support members is connected with one of the spacers to the support structure.

The individual mats are areally connected to the support members.

Each one of the support members is a perforated plate. The perforated plates have different free cross-sectional areas. The perforated plates positioned within an area of great solar radiation intensity of the cross-sectional area of the channel have a greater free cross-section than the perforated plates positioned within an area of less solar radiation intensity of the cross-sectional area of the channel.

The support element is preferably a perforated plate or a grate structure.

In the field of solar technology such fiber-like mat materials are already known. Reference is made especially to FIGS. 5 through 9 of French Patent 2 491 599 and the corresponding description. In these figures there is, for example, shown woven and knitted material. Accordingly, the disclosure of French patent 2 491 599 is also made part of the disclosure of the instant application. As material for the fibers high-temperature resistant metals are especially suitable. However, it is also possible to use fibers, respectively, threads made of ceramic material.

The mat material may have a continuously increasing density or a stepwise increasing density. A stepwise increasing density can, for example, be achieved in an expedient manner by supporting two mats of different densities atop one another within the channel. The two mats must be maintained with suitable connecting measures in their stacked arrangement.

However, it is also possible that the mats are comprised of at least one section of a sock, preferably a metal knit sock, which in the circumferential direction has at least two predetermined circumferential portions of different density and which is areally compressed such that the circumferential portion of lower density is directly exposed to the impinging solar radiation.

The mat can be comprised of a plurality of such sock sections. However, in a preferred manner it is suggested that the mat is comprised of a sock wound in its compressed state. The wound element can be wound as a round spiral, an angular spiral, meander-like etc. When the receiving surface is very large and/or the mat does not have a sufficient stiffness, it is expedient to connect the mat to an areal, air-permeable support structure.

However, it appears to be technically expedient that the mat be comprised of a plurality of individual mats and that each individual mat has coordinated therewith a separate support member such that the individual mats and support members in their plurality cover the cross-sectional area of the channel. In this context it is again expedient that the outer contour of the individual mats connected to the support members corresponds respectively to the outer contour of the support member. The channel cross-section can be covered in an especially simple manner when the support members have a hexagonal, lozenge-like or rectangular shape.

Simple support members can be realized when the support member is a perforated plate or grate structure. In EP 124 769 B1 according to FIG. 4 perforated plates are also provided. However, they serve only as throttle means and not simultaneously as supports for the absorber structure.

A simple support of the absorber structure within the channel is achieved when each support member is connected with at least one spacer to a support structure arranged downstream within the channel.

In order to provide for an especially good connection the individual mat is areally connected to the areal support member, for example, by soldering.

When using a plurality of perforated plates across the channel cross-section, the perforated plates in the area of greater radiation density are provided with a greater free cross-section than in the area of lower radiation density. Such a differing throttle measure is also known from the perforated plates of FIG. 4 of EP 124 769 which, however, are not used as a support for the absorber structure.

BRIEF DESCRIPTION OF THE DRAWINGS

The invention will now be explained with the aid of the accompanying Figures. It is shown in.

DESCRIPTION OF PREFERRED EMBODIMENTS

Figure 1:
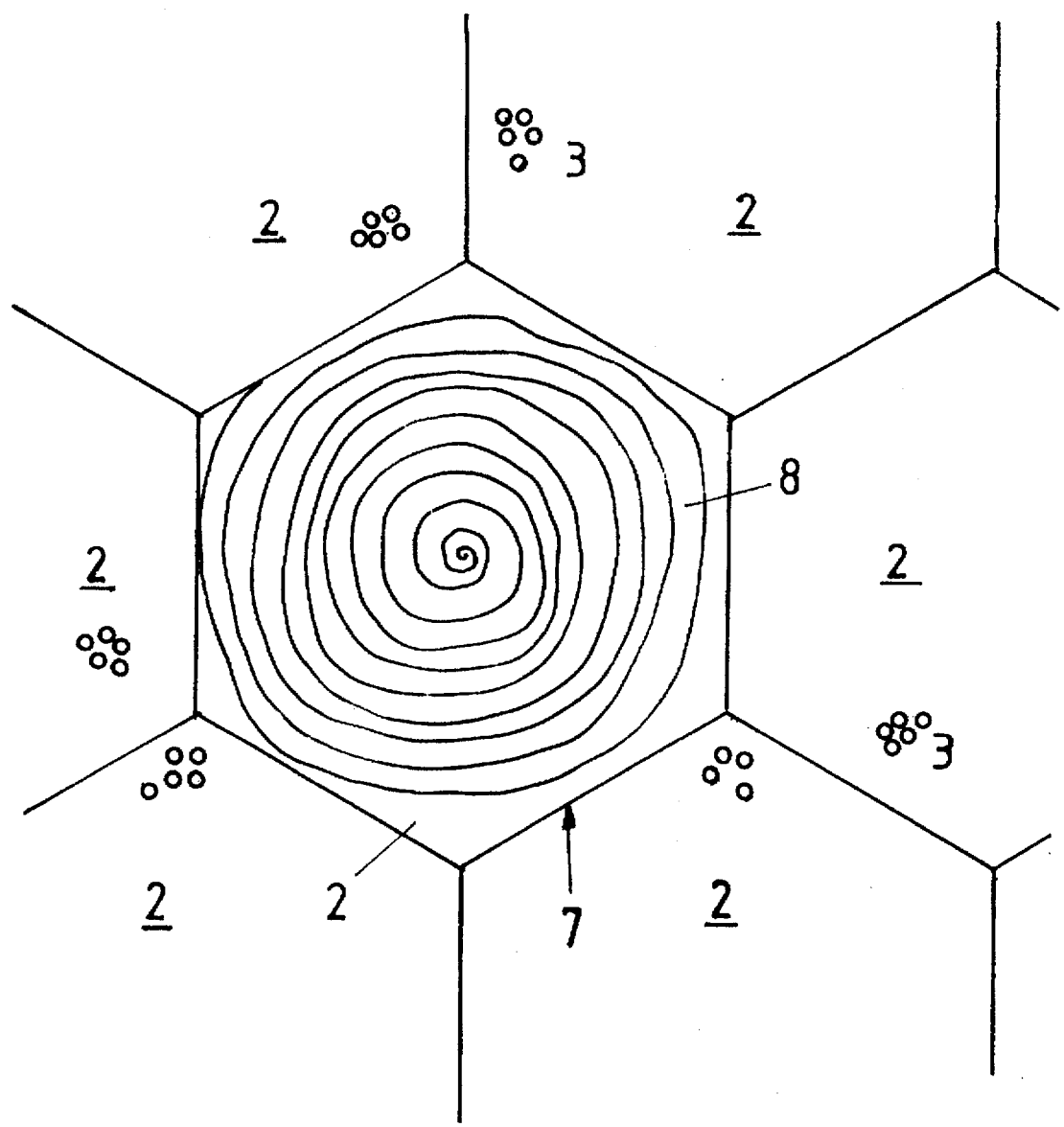
FIG. 1 a partial top view of the inventive absorber structure in which a plurality of individual mats with coordinated support members is provided.

The absorber structure 1 is comprised of a plurality of support members 2 with hexagonal contour. The support members are provided with a plurality of holes 3 which can be circular openings, slots, etc. The support members are connected in hexagonal dense arrangement with spacers 4 at the support structure 5 which itself is connected to the channel wall 6. The cross-section of the channel 6 corresponds in a conventional manner to the entire cross-section of the absorber structure and in the flow direction of the air L transported through the absorber can be provided at a distance to the absorber structure with a bottom. The thus formed chamber can be provided with a channel extending to the transport means and having a smaller diameter.

In FIG. 1 a mat in the form of a spiral 7 is arranged on the central support member and is comprised of a metal knit sock whereby the outer contour of the spiral is deformed such that it abuts the adjacently arranged spiral on the neighboring support member, not represented in FIG. 1, so that the entire surface area of the support members 2 are covered with spirals 7 formed of the mats.

Figure 2:
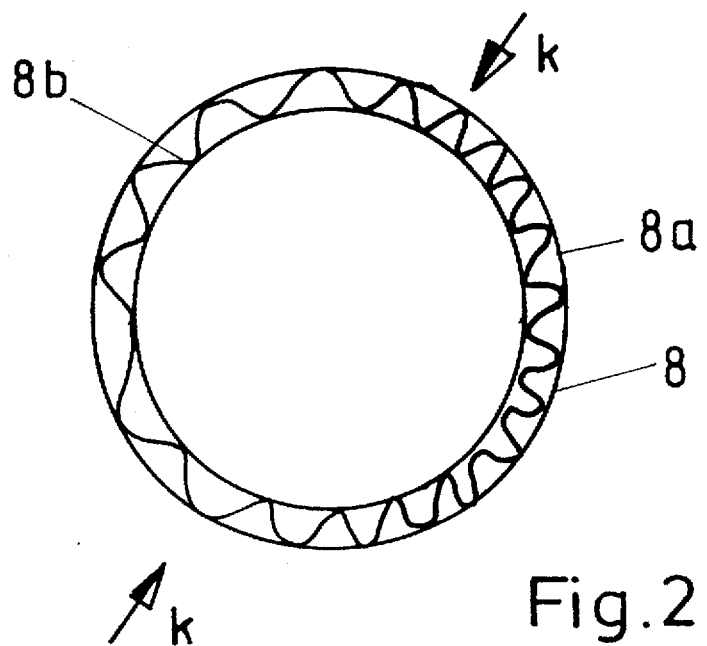
FIG. 2 a cross-section of a hose, respectively, sock in the open state.

In FIG. 2 a cross-section of the spirally wound sock 8 according to FIG. 1 is represented schematically. Along the circumferential portion 8a of approximately 120° the sock has a greater density than along the oppositely arranged circumferential portion 8b. In order to simplify the drawing FIG. 2 shows the different density by wave lines of different wave lengths.

Figure 3:
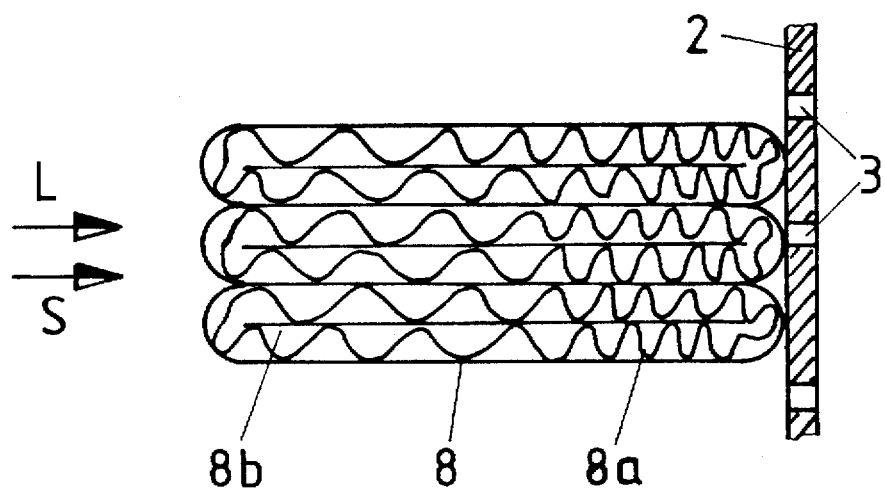
FIG. 3 a plurality of socks according to FIG. 2 in the compressed states.

When such a knit sock 8 is compressed in the direction of forces K of FIG. 2, a band according to FIG. 3 results in which the respective halves of the portions 8a and the halves of the portions 8b abut one another. This band is, as indicated in FIG. 3, wound to the spiral 7 shown in FIG. 1 and the spiral is fastened, for example, soldered, with the portion 8a abutting at the support member 2 to the support member. In this manner the solar radiation which according to FIG. 1 enters from the top and according to FIG. 3 enters from the left impinges first the material portions of lower density so that the desired absorption can take place, while the area of higher density serves for fastening at the support plate and simultaneously absorbs the radiation penetrating to this depth. Of course, the portions must not have an angle of 120°. When, for example, the area 8a in the compressed state according to FIG. 3 can have a smaller width, it is also possible to knit socks with more than two different areas of density. For reasons of simplification FIG. 4 only shows the density portions 8a and 8b of different density, but not the individual windings of the spiral.

Figure 5:
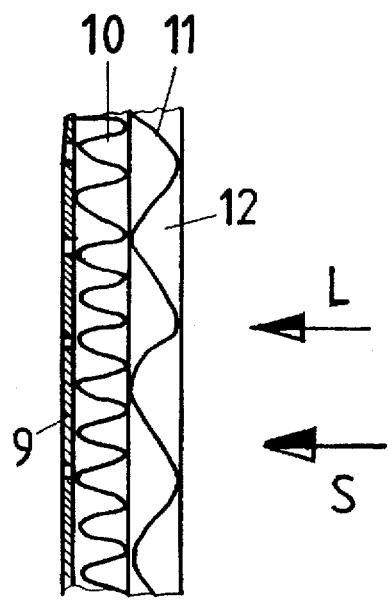
FIG. 5 a schematic cross-section of the absorber structure in which two mats of different density are used in a stacked arrangement.

In the embodiment according to FIG. 5 two mats 10 and 11 are stacked one atop another on a support 9 whereby the mat facing the radiation S has a reduced density relative to the mat 10 resting on the support 9. Again, the different density is, for reasons of simplicity, illustrated by wave lines of different wave lengths.

Figure 4:
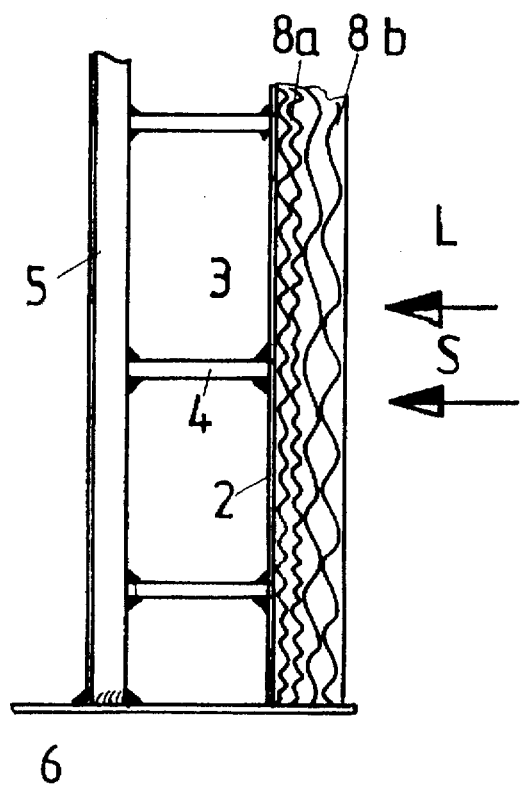
FIG. 4 a part-sectional view of the receiver for illustrating the fastening of the individual support members.

As in the embodiment according to FIGS. 1 and 4, in the embodiment of FIG. 5, instead of the entire cross-section of the channel covered by a mat component, a construction with individual mats and individual support elements (modular construction) can be provided when this is needed for greater receiver surfaces in order to construct a more stable absorber structure. On the other hand, instead of a modular embodiment, as disclosed in context with FIGS. 1 to 4, it is also possible for certain receiver sizes to provide a single sock section as a spiral.

The present invention is, of course, in no way restricted to the specific disclosure of the specification and drawings, but also encompasses any modifications within the scope of the appended claims.

What we claim is:

1. A high-temperature receiver for converting concentrated solar radiation, said receiver comprising:

a channel with an inlet and an outlet;

an areal air-permeable support element connected to said inlet and extending transverse to said channel for covering a cross-section of said channel;

an absorber structure for absorbing solar radiation, said absorber structure connected to said support element and comprised of an air-permeable mat material;

means for transporting air as a cooling medium through said absorber structure in a flow direction identical to a direction in which the solar radiation hits said absorber structure;

wherein said mat material has a first density in an area where the solar radiation enters said absorber structure and a second density in an area where said absorber structure is connected to said support element; and wherein said first density is lower than said second density, said first density favoring absorption of the solar radiation and the second density providing for a secure fastening of said absorber structure to said support element.

2. A receiver according to claim 1, wherein said mat material has a continuously increasing density from said first density toward said second density.

3. A receiver according to claim 1, wherein said mat material has a density that increases stepwise from said first density to said second density.

4. A receiver according to claim 1, wherein said absorber structure comprises a first mat having said first density and a second mat having said second density.

5. A receiver according to claim 1, wherein said absorber structure comprises a mat comprised of at least one sock section of a sock having in a circumferential direction thereof a first circumferential portion having said first density and a second circumferential portion having said second density, wherein said sock is areally compressed in the radial direction such that said first circumferential portion is directly exposed to the solar radiation.

6. A receiver according to claim 5, wherein said sock is a knit metal sock.

7. A receiver according to claim 5, wherein said mat comprises a plurality of said sock sections.

8. A receiver according to claim 5, wherein said mat is comprised of one of said sock sections and wherein said areally compressed sock section is wound to a spiral.

9. A receiver according to claim 1, wherein said areal air-permeable support element is comprised of a plurality of support members arranged adjacent to one another so as to cover said cross-section of said channel and wherein said absorber structure is comprised of a plurality of individual mats, wherein each one of said mats is supported on one of said support members.

10. A receiver according to claim 9, wherein a contour of said individual mats substantially matches a contour of support members.

11. A receiver according to claim 9, further comprising a support structure with spacers connected within said channel downstream of said support element in said flow direction, wherein each one of said support members is connected with one of said spacers to said support structure.

12. A receiver according to claim 9, wherein said individual mats are areally connected to said support members.

13. A receiver according to claim 9, wherein:

each one of said support members is a perforated plate;

said perforated plates have different free cross-sectional areas;

said perforated plates positioned within an area of great solar radiation intensity of said cross-section of said channel have a greater free cross-sectional area than said perforated plates positioned within an area of less solar radiation intensity of said cross-section of said channel.

14. A receiver according to claim 1, wherein said support element is a perforated plate.

15. A receiver according to claim 1, wherein said support element is a grate structure.

* * * * *